J. HEBERLING.
Hand Seed-Planter.
No. 104,028.
Patented June 7, 1870.
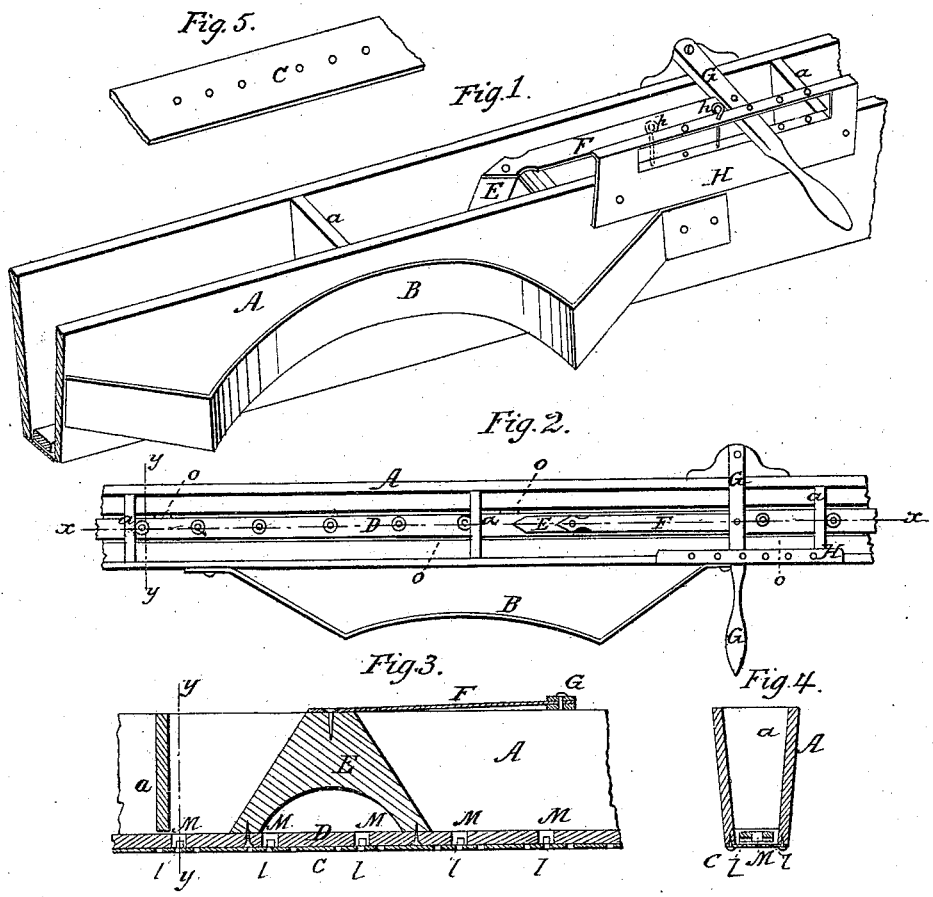

UNITED STATES PATENT OFFICE.

JOHN HEBERLING, OF MOUNT PLEASANT, OHIO.

IMPROVEMENT IN HAND SEED-PLANTERS.

Specification forming part of Letters Patent No. 104,028, dated June 7, 1870.

*To all whom it may concern:*

Be it known that I, JOHN HEBERLING, of Mount Pleasant, in the county of Jefferson and State of Ohio, have invented a new and useful Hand Seed-Sower; and I do hereby declare that the following is a full, clear, and exact description thereof, sufficient to enable those skilled in the art to which my invention appertains to make and use the same.

My invention relates to that class of seed-sowers for grass and other small seeds which are carried by the operator and worked by hand, and in which the seed is fed through the perforated bottom of the hopper by means of a reciprocating bar; and it consists in a peculiar construction and arrangement which enables the operator to observe any obstructions, and thus prevent clogging of the parts; also, in providing durable guides for the reciprocating bar.

In the accompanying drawing, Figure 1 is a perspective view of my improved seed-sower. Fig. 2 is a top view of the same. Fig. 3 is a central longitudinal vertical section taken in the line $x\,x$, Fig. 2. Fig. 4 is a transverse vertical section taken in the line $y\,y$, Fig. 2. Fig. 5 is a perspective view of the perforated bottom of the hopper.

A represents the hopper, made of wood, divided into sections by partitions $a$, and provided with a brace, B, which rests against the body of the operator, and with a strap to suspend it from his shoulders. The bottom C of the hopper is made of metal, preferably of zinc, and is pierced with small holes in groups of three or more, as desired.

Sliding on the bottom of the hopper A is a bar, D, near the center of which is a brace, E, which is connected by a strap or rod, F, to a lever, G, one end of which is pivoted to the front side of the hopper, the other end passing through a slot in a plate, H, fastened to the rear side of the hopper, the slot serving as a guide for the lever.

The plate H projects a short distance above the top of the hopper, and then turns at a right angle toward the front, forming a flange, in which are small holes, corresponding in position with holes in the edge of the hopper, and which receive a pin, $h$, for lengthening or shortening the space traversed by the lever.

The bar D is made slightly narrower than the bottom of the hopper, in order to allow the seed to pass on each side of it. On the under side are transverse notches, which allow the seed to pass to the perforations in the metallic bottom. The notches are shown at $l$ in Figs. 3 and 4.

In addition to the notches $l$, the bar D has perforations M, passing from top to bottom, as shown in Figs. 2, 3, and 4. The diameter of these perforations is equal to the distance between any two of each group of those in the metallic bottom, and they communicate with the notches $l$ at right angles.

The perforations M and notches $l$ are placed so that each perforation and notch communicates with one group of perforations in the metallic bottom, and when the bar is reciprocated longitudinally, as one of the holes in the metallic bottom is being covered another is being at the same time uncovered.

For guiding the bar D and keeping it in place I make use of small blocks of leather, O, tacked or nailed to the sides of the hopper at suitable distances, preferably near one end of a section on one side, and near the other end on the other side, as shown in Fig. 2.

In many of the seed-sowers now in use in which the seed is fed through the perforated bottom by means of a reciprocating bar, great difficulty is experienced in consequence of the clogging of the parts, owing to the fact that the seed reaches the perforated bottom only by passing on each side of and under the reciprocating bar, and any substance which may thus enter and clog the parts cannot be removed without taking the machine to pieces. This difficulty is obviated in my invention by means of the perforations M in the bar D, for if the parts become clogged, as above described, the operator can at once discover and remove the obstruction without serious delay or inconvenience.

Another difficulty experienced in the use of the machines above referred to is the breaking of the guides which are designed to keep the reciprocating bar in place.

In some cases the partitions dividing the hopper into sections extend down to the perforated bottom on each side of the reciprocating bar, and thus serve as guides for the bar;

but in such cases they prevent the passage of seed from one section to another, and the material, being of wood, is liable to swell from moisture and to shrink from dryness, and in time the projecting portions are broken off and the bar left without guides. In other cases the partitions extend only to the top of the bar, and small blocks of wood are fastened to the sides of the hopper to serve as guides; but these also are liable to swell and shrink, and finally break off. This difficulty is also obviated in my invention by the use of leather for the guides, as it is found to be less affected than wood by moisture and dryness, and is therefore not subject to the objections above referred to. Leather is also softer than wood, and therefore not so liable to grind and crush the seed which may fall between it and the bar.

I do not confine myself, however, to the use of leather for this purpose, but claim the right to use any other material which will answer equally well.

Having thus described my invention, what I claim as new, and desire to secure by Letters Patent, is—

The perforated reciprocating bar D, working on the top of the metallic bottom C, in combination with the leather guides O and perforated metallic bottom C, when the perforations M are equal in diameter to the spaces between the perforations $i$, as shown and described.

JOHN HEBERLING.

Witnesses:
E. R. BROWN,
C. C. THEAKER.